3,182,614
SAFETY SEAT
Scott McLean, Bowling Green, Ky., assignor to L. F. Strassheim Company, Bowling Green, Ky., a corporation of Kentucky
Filed July 16, 1964, Ser. No. 383,176
1 Claim. (Cl. 108—118)

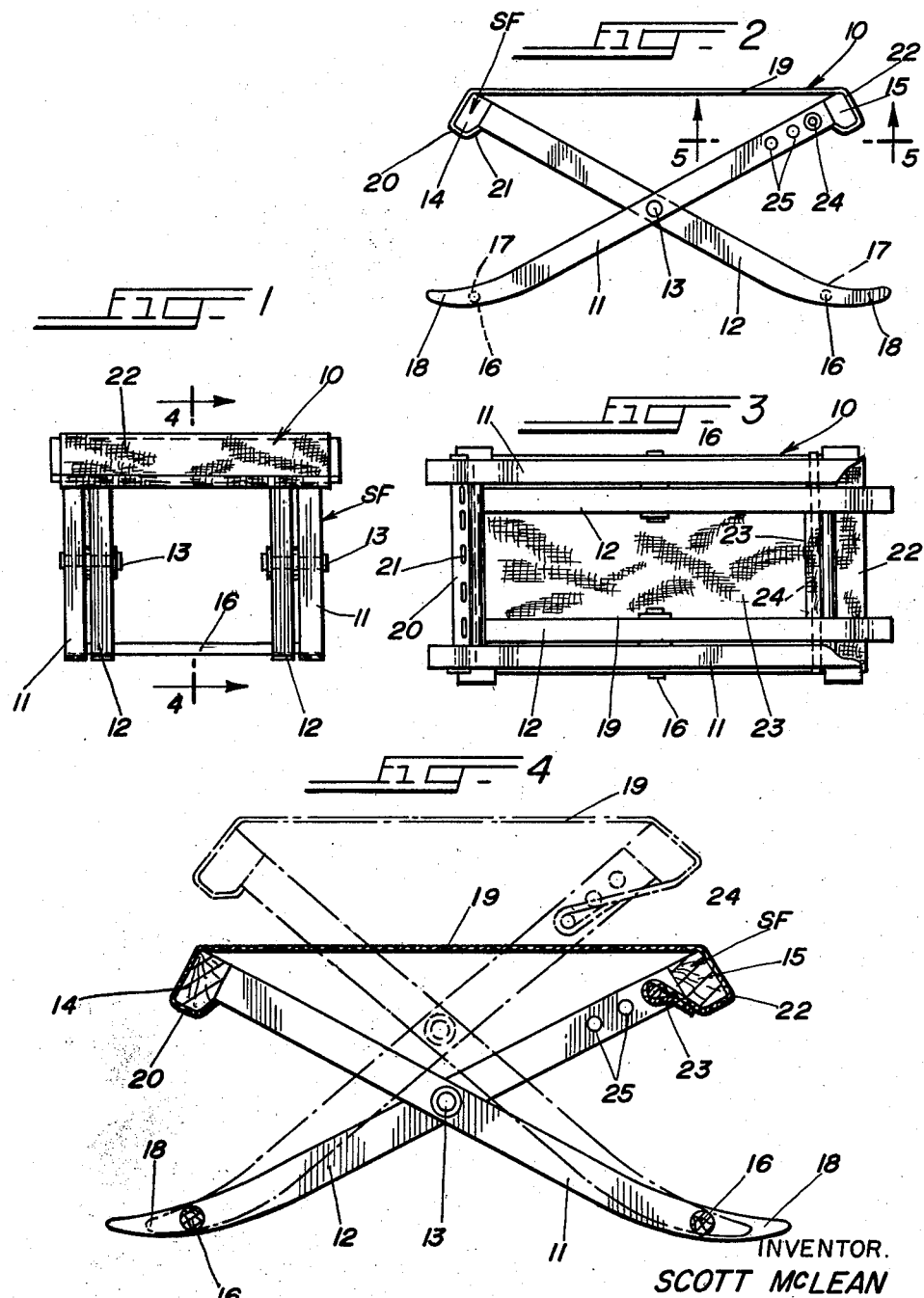

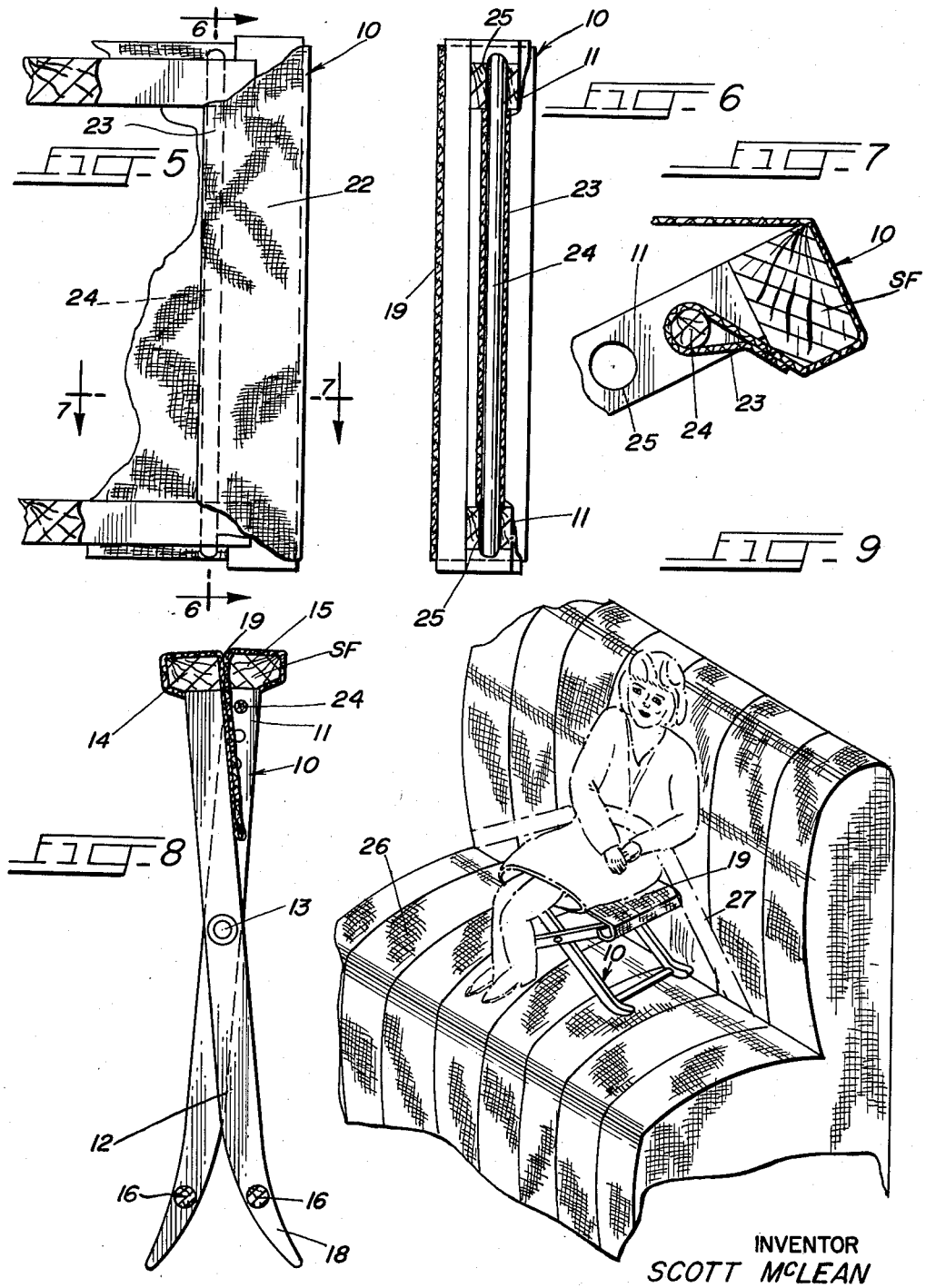

This invention relates to a collapsible safety seat for children, and more particularly, to a safety seat which is adapted to be used by small children upon a seat cushion of an automotive vehicle or other supporting surface.

An object of the invention is to provide a new and improved collapsible safety seat for use for small children in automotive vehicles and which is so designed, constructed and arranged that it may be placed in position of use upon the seat cushion of an automotive vehicle and rested against the back rest cushion thereof, so that a child seated on the new safety seat may ride safely and comfortably while being readily secured in position of use by a safety belt.

Another object of the invention is to provide a new and improved safety seat for use by small children in automotive vehicles, and which is so designed and constructed that it may be adjusted for use by small children of different ages and sizes, within certain limits.

A further object of the invention is to provide a new and improved safety seat for use by small children in automotive vehicles and which is so designed, constructed and arranged that it will ride safely upon the seat cushion of an automotive vehicle while, at the same time, not penetrating into or marring the seat cushion.

An additional object of the invention is to provide on the new safety seat a novel means for detachably and adjustably attaching the relatively free end portion of the flexible fabric seat member to the supporting frame of the new safety seat.

Other objects will appear hereinafter.

In the drawings:

FIG. 1 is a side elevational view of the new safety seat;

FIG. 2 is a front elevational view thereof;

FIG. 3 is a bottom plan view;

FIG. 4 is a sectional elevational view on line 4—4 in FIG. 1, illustrating the manner in which the new safety seat may be adjusted for vertical height for use by small children of different sizes and ages, within certain limits;

FIG. 5 is a fragmentary sectional view, partly in bottom plan, on line 5—5 in FIG. 2;

FIG. 6 is a sectional view on line 6—6 in FIG. 5;

FIG. 7 is a sectional detail view on line 7—7 in FIG. 5;

FIG. 8 is a side sectional view similar to FIG. 4 but showing the seat in a fully collapsed position; and FIG. 9 is a perspective view illustrating a preferred form of the new safety seat in position of use upon the seat cushion of an automotive vehicle.

A preferred embodiment of the new safety seat is illustrated in the drawing, where it is generally indicated at 10, and comprises a supporting frame SF which includes two pairs of supporting legs 11 and 12, the outer leg 11 in each pair of legs 11-12 being arranged outwardly or forwardly of each of the inner legs 12 in each pair of legs 11-12. The legs 11-12 in each pair of legs 11-12 are pivotally interconnected, adjacent the mid portions thereof, by suitable pivot means in the form of bolts or pivot pins 13. The supporting frame SF of the new safety seat also includes a pair of seat rails 14 and 15 which extend transversely thereacross at the upper and outer ends of each pair of legs 11-12. The supporting frame SF also includes transversely extending brace members, in the form of dowel pins 16, one of which extends transversely through and between each of the pairs of legs 11-12. These dowel pins 16 are mounted in dowel pin openings or holes 17 formed in the lower portions of the legs 11 and 12 immediately above the slightly upwardly flared or curved lower end portions 18 of the legs 11-12 which are provided in the legs 11-12 for reasons which will be pointed out hereinafter.

The new safety seat includes a canvas or like flexible fabric or like seat member 19 which extends between the seat rails 14 and 15 and the flexible fabric seat member 19 has a relatively fixed end portion 20 which is wrapped partially around one seat rail 14 of the supporting frame SF and is suitably fastened thereto, as by means of tacks, or like fastening elements, 21. The other and relatively free end portion 22 of the flexible fabric seat member 19 is wrapped partially around the other seat rail 15 and has a dowel-receiving welt 23 formed therein which extends between the inner legs 11 and is adapted to receive a transversely extending and adjustable dowel pin 24 which is extended therethrough. The new safety seat includes means for detachably and adjustably attaching the relatively free end portion 22 of the flexible fabric seat member 19 to the supporting frame SF and to this end the dowel pin 24 is extended through the welt 23 in the relatively free end portion 22 of the flexible fabric seat cover 19 and is inserted selectively through any one of three pairs of aligned holes 25 which are formed in the upper portions of the outer legs 11. As shown in FIG. 2, the holes 25 are arranged in rows which extend lengthwise of the outer legs 11.

The new safety seat may be manually collapsed for packaging, shipping and handling, as in FIG. 5, with the adjustable dowel pin 24 withdrawn from the welt 23 and from a selected pair of the holes 25 in the outer legs 11. However, in order to assemble the new collapsible safety seat the legs 11-12 may be spread or pivoted upon the pivot members 13 whereupon the relatively free end portion 22 of the flexible fabric seat cover 19 may be wrapped partially around and so as to partially encircle the seat rail 15 and the adjustable dowel pin 24 inserted through the welt 23 therein and through a selected pair of aligned holes 25 in the outer legs 11, thereby detachably and adjustably attaching the relatively free end portion 22 of the flexible fabric seat member 22 to the supporting frame SF and securing the parts of the new safety seat in operative and assembled position. When the parts are so disposed, the welt 23 extends between the outer legs 11 adjacent the upper end portions thereof. As clearly illustrated in FIG. 8, the seat assembled as above may be collapsed. In this fully collapsed condition, the three holes in the outer legs 11 are spaced to the side of legs 12, and the dowel pin located therein is precluded from being broken by engagement with inner legs 12.

In the use of the new safety seat 10, the same may be assembled, as described, and then positioned upon the top of a seat cushion 26 of an automotive vehicle, and a child seated thereon with a safety belt 27 extending around the body of the child and with the feet of the child resting upon the seat cushion 26. When the new safety seat is so disposed the rounded and slightly upwardly flared lower end portions 18 of the legs 11-12 rest upon the seat cushion 26 and the brace members or dowel pins 16 also rest upon and bear down against the seat cushion 26 to provide further support for the safety seat on the seat cushion 26 of an automotive vehicle or like supporting surface while, at the same time, the dowel pins or brace members 16 prevent the legs 11-12 from penetrating into or otherwise damaging the seat cushion 26, or other supporting surface.

In order to adjust the new safety seat for children of different sizes and ages, within limits, the adjustable dowel pin 24 may be withdrawn from the welt 23, and from a selected pair of aligned holes 25 in the outer legs 11 and inserted through another selected pair of aligned holes 25 so as to vary the height of the flexible fabric seat cover 19, relative to the seat cushion 26, as indicated in FIG. 4.

Thus, it will be noted that by lowering the height of the flexible fabric seat cover 19, relative to the seat cushion 26, the new safety seat 10 may be adjusted for use by an older and larger child since in such instances the longer legs of the older child will hang down over the front end portion of the seat cushion 26, whereas with a smaller child, the flexible fabric seat cover 19 is preferably arranged at a higher level, so that the child's feet will rest upon the seat cushion 26.

While the new safety seat has been disclosed as being particularly adapted for use by small children upon the seat cushion of an automotive vehicle it may be used in other places and on other supporting surfaces, as desired.

It will thus be seen from the foregoing description, considered in conjunction with the accompanying drawing, that the present invention provides a new and improved safety seat for use by small children in an automotive vehicle and other places, and has the desirable advantages and characteristics and accomplishes its intended objects including those hereinbefore pointed out and others which are inherent in the invention.

I claim:

A collapsible seat comprising a support frame including an outer pair of supporting legs and an inner pair of supporting legs, pin means pivotally interconnecting adjacent legs in said outer and inner pair of supporting legs, said pin means being located between the ends of said supporting legs, a pair of seat rails, one of said seat rails connecting together the upper outer ends of said outer pair of legs, the other seat rail connecting together the upper outer ends of said inner pair of legs, each of said supporting legs having a rounded and slightly upwardly flared lower outer end portion, the flared portion of each supporting leg being in a plane parallel to the planes containing the flared portions of the other legs, said flared portions of said legs spaced from the extreme lower end thereof constituting the bearing surface on which said seat rests when used, a brace member extending between each pair of the said legs and being attached thereto immediately inwardly and upwardly of said rounded and slightly upwardly flared lower end portions of said legs, a flexible seat member of a width for a major portion of its length greater than the outer dimension of said outer pair of supporting legs extending between said seat rails and having a relatively fixed end portion attached to the seat rail connecting said inner pair of supporting legs and having a relatively free end portion extending over and partially encircling the other one of said seat rails and terminating in a welt which extends between the said outer legs adjacent the upper end portion thereof, the said upper end portion of each of said outer legs having a row of spaced holes therein, each hole extending completely through the leg in which it is formed and being spaced from the ends and other sides of the leg, the said row of holes extending lengthwise of said outer legs in which they are formed, the said holes in each row of said holes being aligned in pairs, a dowel pin of a length greater than the outer dimensions of said outer pair of supporting legs inserted through the said welt in said flexible seat member and being selectively insertable through an aligned pair of said holes in the upper end portion of the said outer legs in which said holes are formed, said seat being so constructed and arranged that on pivotal collapse of said frame, said seat rails limit further collapse prior to breaking of said dowel pin by engagement thereof with the inner pair of legs when said dowel pin is in the pair of holes immediately above said pin means.

References Cited by the Examiner

UNITED STATES PATENTS

| 560,669 | 5/96 | Abel | 108—118 |
| 1,011,585 | 12/11 | Creasey | 108—64 |
| 1,065,004 | 6/13 | Senge | 108—144 |
| 1,202,660 | 10/16 | Breault | 108—118 |
| 1,456,840 | 5/23 | Zsikay | 108—118 |
| 2,471,564 | 5/49 | Gaudette | 108—118 |

FOREIGN PATENTS

| 17,370 | 6/13 | Denmark. |

FRANK B. SHERRY, *Primary Examiner.*

UNITED STATES PATENT OFFICE
CERTIFICATE OF CORRECTION

Patent No. 3,182,614

May 11, 1965

Scott McLean

It is hereby certified that error appears in the above numbered patent requiring correction and that the said Letters Patent should read as corrected below.

In the grant, line 3, and in the heading to the printed specification, lines 4 and 5, for "a corporation of Kentucky", each occurrence, read -- a corporation of Wisconsin --.

Signed and sealed this 28th day of September 1965.

(SEAL)
Attest:

ERNEST W. SWIDER
Attesting Officer

EDWARD J. BRENNER
Commissioner of Patents